United States Patent [19]
Wehrli et al.

[11] 3,817,989
[45] June 18, 1974

[54] PROCESS FOR THE PRODUCTION OF 14β, 18- AND 5β, 19-(EPOXYETHANOIMINO)-STEROIDS

[75] Inventors: Hansuli Wehrli, Schaffhausen; Oskar Jeger, Zollikerberg, both of Switzerland

[73] Assignee: Ciba-Geigy Corporation, Ardsley, N.Y.

[22] Filed: Dec. 8, 1971

[21] Appl. No.: 206,170

[30] Foreign Application Priority Data
Dec. 14, 1970 Switzerland.................. 18469/70
Dec. 14, 1970 Switzerland.................. 18585/70

[52] U.S. Cl.............. 260/239.55 R, 260/239.57, 260/397.45, 260/397.5
[51] Int. Cl............................................ C07c 173/00
[58] Field of Search................... 260/239.55, 239.5

[56] References Cited
UNITED STATES PATENTS
3,706,737  12/1972  Wehrli et al............. 260/239.55 R

*Primary Examiner*—Elbert L. Roberts
*Attorney, Agent, or Firm*—Joseph G. Kolodny

[57] ABSTRACT

A new process for the production of 14β, 18- and 5β, 19-(epoxyethanoimino)-steroids is provided, which comprises reacting corresponding thiolactams, i.e. 2'-thioxo-14β, 18- and 5β, 19-(epoxyethanoimino)-steroids, with Raney Nickel in an organic solvent. The 2'-thioxo-compounds are in turn obtained from corresponding lactams, i.e. 2'-oxo-14, 18- and 5β, 19-(epoxy-ethanoimino)-steroids, by heating with phosphorus pentasulfide in pyridine. By a specific embodiment 1'-methyl-2'-thioxo-3β-methoxy-3α, 9α-epoxy-11α, 20ξ-diacetoxy-14β, 18-(epoxyethanoimino)-5β, 17α-pregnane is converted into 1'-methyl-3β-methoxy-3α, 9α-epoxy-11α, 20ξ-diacetoxy-14β, 18-(epoxyethanoimino)-5β, 17α-pregnane.

14 Claims, No Drawings

PROCESS FOR THE PRODUCTION OF 14β, 18- AND 5β, 19-(EPOXYETHANOIMINO)-STEROIDS

DETAILED DESCRIPTION

The object of the present invention is a process for the production of steroid compounds of the general Formula I,

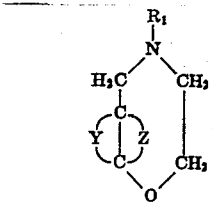

wherein
$R_1$ represents a lower alkyl group, the benzyl group or hydrogen, and
one of the symbols Y and Z represents an aliphatic radical and the other a binuclear cycloaliphatic radical which together complete formula I to formula Ia

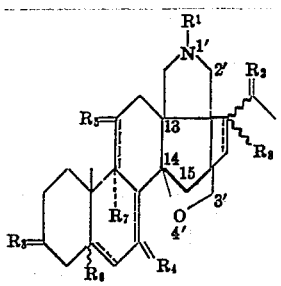

wherein
$R_1$ has the meaning given under formula I,
$R_2$ represents a protected oxo radical, or an esterified or etherified hydroxyl group and a hydrogen atom,
$R_3$ represents a protected oxo radical, or an esterified or etherified hydroxyl group and a hydrogen atom, or an etherified hydroxyl group and together with $R_7$ an epoxy radical.
$R_4$ and $R_5$ each independently represent a protected oxo radical, or an esterified or etherified hydroxyl group and a hydrogen atom, or two hydrogen atoms, or, when occurring at a double bond, one hydrogen atom.
$R_6$ represents an α- or β-oriented hydrogen atom,
$R_7$ represents an α-oriented hydrogen atom, an α-oriented hydroxyl group, or together with $R_3$ an epoxy radical, and
$R_8$ represents an α- or β-oriented hydrogen atom, or an esterified or etherified hydroxyl group,
whereby double bonds may be present in the positions 5, 7, 9 (11) and 16 corresponding to the dotted lines with the elimination of $R_6$, $R_7$ and/or $R_8$, or to formula Ib,
wherein
$R_1$ has the meaning given under formula I, and

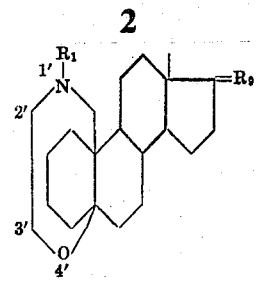

$R_9$ represents a protected oxo radical or an esterified or etherified hydroxyl group in the β-position together with a hydrogen atom or a lower aliphatic hydrocarbon radical
whereby in the other, unoccupied positions of the steroid structure there can be present double bonds and/or further monovalent, geminal bivalent or non-geminal bivalent substituents such as esterified or etherified hydroxyl groups, additional methyl groups, or protected oxo radicals or methylene groups, or epoxy radicals, respectively.

As lower alkyl group, $R_1$ contains preferably one to five carbon atoms and is particularly a methyl group, further, e.g. an ethyl group, a n-propyl group, an isopropyl group, a butyl group or pentyl group. The aforementioned esterified hydroxyl groups in 20-position of the compounds of the formula Ia or in the 17β-position of the compounds of the formula Ib respectively are derived from lower alkanoic acids such as: acetic acid, propionic acid, butyric acid, isobutyric acid, valeric acid, isovaleric acid, pivalic acid of formic acid; or from pyrrole carboxylic acids and alkyl-substituted pyrrole carboxylic acids such as 2,4,5-trimethylpyrrole-3-carboxylic acid, 2,4-dimethylpyrrole-3-carboxylic acid or 2-ethyl-4-methylpyrrole-3-carboxylic acid. Esterified hydroxyl groups in the positions 3, 7, 11 and/or 17 of the formula Ia or in the further positions of the compounds of the formula Ib are derived from lower alkanoic acids, e.g. from the afore-mentioned lower alkanoic acids.

Suitable etherified hydroxyl groups in the positions 3, 20, 7, 11 and/or 17 of the compounds of the formula Ia or in the position 17β and further positions of the compounds of the formula Ib are, in particular, those which are derived from lower alkanols such as methyl alcohol, ethyl alcohol, propyl alcohol, isopropyl alcohol, or from the butyl or amyl alcohols. Suitable as etherified hydroxyl group are, for example, also the (tetrahydro-2H-pyran-2-yl)-oxy group, as well as the benzyloxy group and the triphenyl-methoxy group, the 4-methoxy-tetrahydro-pyran-4-yloxy group and the 1,-1-methoxy-cyclohexyl-1-yloxy group. Protected oxo radicals in the 3-, 20, 7- and/or 11-positions of the compounds of the formula Ia or in the 17-position and further positions of the compounds of the formula Ib are ketal groupings which are derived from lower alkanediols of from lower alkanols.

The lower aliphatic hydrocarbon radical in position 17α may be saturated or unsaturated. Preferably, such a radical contains one to four carbon atoms and is in particular, a methyl or ethinyl group or further, e.g., an ethyl, propyl, vinyl, allyl, 2-methylallyl, 1-propinyl or 2-propinyl group.

The compounds of the general formula I possess valuable pharmacological properties, especially blood-circulation-promoting activity. Compounds of the general formula Ia selectively raise the permeability of muscle and nerve membranes for sodium ions. The resulting increase of influx of sodium ions causes an acceleration of depolarization and thus also of muscle contraction. Since according to recent evidence cardio-active substances of the digitalis-strophanthin type hinder the active transfer of sodium ions out of the muscle fibers by blocking the transfer-adenosin triphosphate-ase of the membranes thus likewise increasing the sodium concentration, and accelerating depolarization and muscle contraction, the compounds of general formula I lead ultimately, via the different mechanism already mentioned, to therapeutic effects which are similar to those of the cardio-active digitalis substances such as strengthening of the systole and of the minute volume of the heart.

The compounds of the general formulae I$a$ and I$b$ are also valuable intermediate products for the preparation of other pharmacologically effective compounds with similar properties. Some possibilities for the further conversion of compounds of the general formula I$a$ are indicated hereinafter.

Of particular importance as pharmacologically active substances and as intermediate products therefor are the compounds of the general formula I$c$

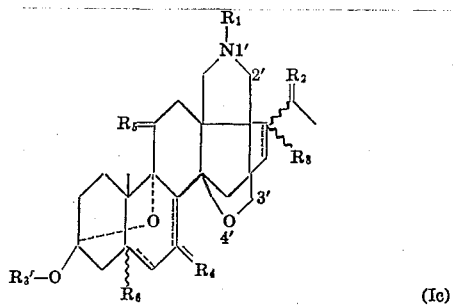

(I$c$)

wherein $R_3'$ represents a lower alkyl group or the benzyl group, and $R_1$, $R_2$, $R_4$, $R_5$, $R_6$, $R_7$ and $R_8$ have the meaning given under formula I or I$a$ respectively, whereby double bonds can be present in the positions 5, 7 and 16 corresponding to the dotted lines, with the elimination of $R_6$ and $R_8$ accordingly.

The process for the production the compounds of general formula I of the present application and of their acid addition salts is characterised in that a compound of the general formula II

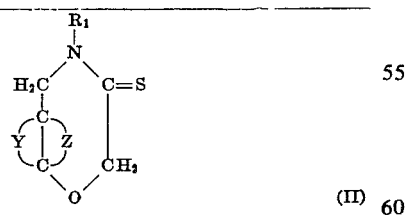

(II)

wherein $R_1$, Y and Z have the meaning given for formula I, is reacted with Raney-Nickel in an organic solvent and if desired, the compound of the general formula I obtained in converted into an addition salt with an inorganic or organic acid.

The reaction according to the invention with Raney nickel is performed, for example, at temperatures of between 0° and 50°C, preferably at room temperature, in an organic solvent such as, e.g. ethanol, methanol or acetone. The Raney nickel is preferably used in an appreciable excess, i.e. the amount thereof corresponds to the 2- to 20-fold amount by weight of the starting material of general formula II. If the starting material contains double bonds it is of advantage to reduce the activity of the Raney nickel by treatment thereof with acetone before the reaction, and/or to perform the subsequent reaction in acetone.

The compounds of the general formula II are new compounds which are embraced either by the narrower general formula II$a$

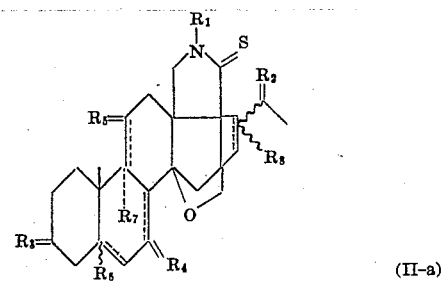

(II-a)

wherein $R_1$ to $R_8$ have the meanings given under formula I or I$a$ respectively and the double bonds mentioned there can be present, or by the narrower general formula II$b$

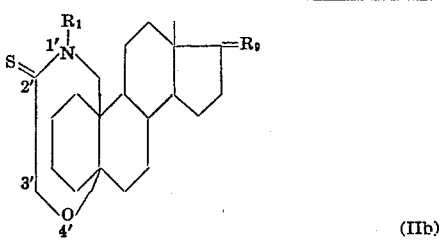

(II$b$)

wherein $R_1$ and $R_9$ have the meanings given under formula I or I$b$ respectively, and the substituents and double bonds mentioned there can be present.

The compounds of the general formula II$a$ can be obtained by $a$) partial alkaline hydrolysis of a compound of the general formula III,

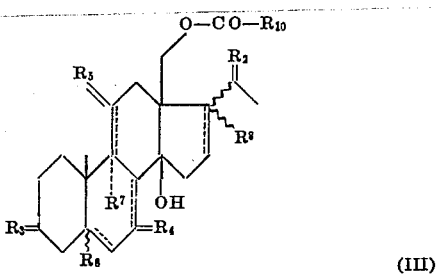

(III)

wherein $R_{10}$ represents a lower alkyl radical, hydrogen or the phenyl group and $R_2$ to $R_8$ have the meanings given under formula I$a$, whereby double bonds may be present in the positions 5, 7, 9 (11) and 16 corresponding to the dotted lines with the elimination of $R_6$, $R_7$ and/or $R_8$, in order to cleave off the acyl group $-CO-R_{10}$;

b) oxidising the compound obtained of the general formula IV

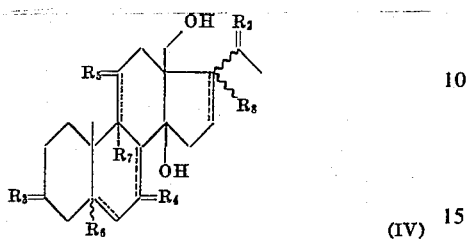

(IV)

to convert the 18-hydroxy group into the 18-oxo radical;

c) reacting the oxidation product of the general formula V

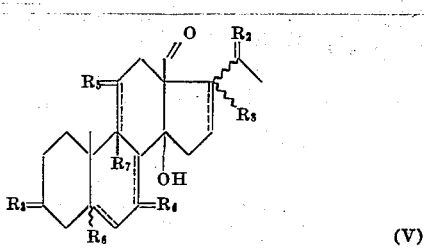

(V)

with a compound of the general formula VI, $H_2N-R_1$ wherein $R_1$ has the meaning given under formula I and, if necessary, reacylating hydroxyl groups in $R_2$, $R_3$, $R_4$ and/or $R_5$ which have been set free;

d) then reducing the reaction product of the general formula VII

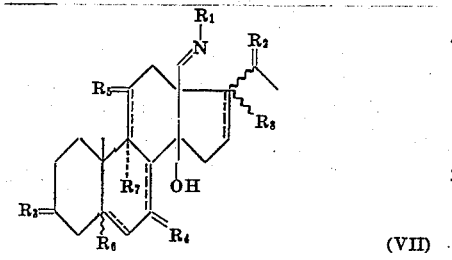

(VII)

by means of a complex hydride to the compound of the general formula VIII

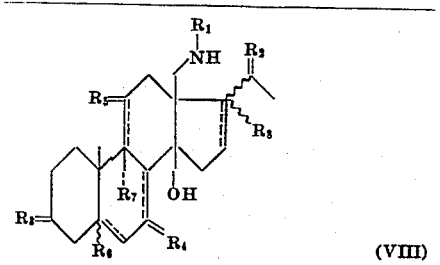

(VIII)

e) reacting the compound of the general formula VIII with a reactive functional derivative of a halogenoacetic acid in the presence of an acid binding agent to obtain a compound of the general formula IX,

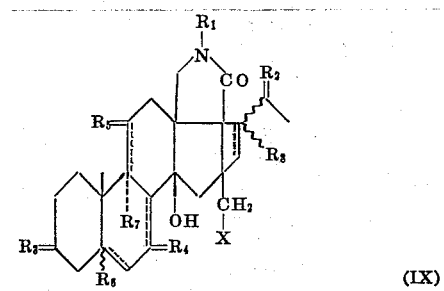

(IX)

wherein

X represents a halogen atom, e.g. chlorine, bromine or iodine, and $R_1$ to $R_8$ have the meanings given under the formula I or Ia respectively and the double bonds mentioned there can be present, f) then cyclising the compound of the general formula IX by reaction with a basic metal compound in the presence of an organic solvent which is inert and/or one containing hydroxyl groups, to a lactam of the general formula X,

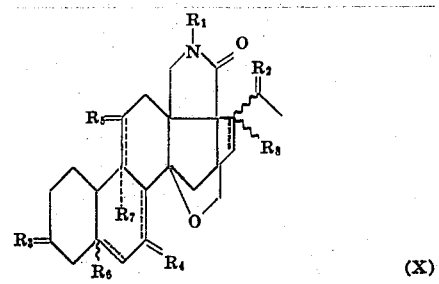

(X)

wherein $R_1$ to $R_8$ have the meanings given under formula I or Ia respectively and the double bonds mentioned there can be present, and g) heating the lactam of the general formula X with phosphorus pentasulfide in an organic solvent.

The partial hydrolysis, step (a) of the above-defined reaction sequence, is preferably performed by reacting the compound of general Formula III with about the equimolar or equivalent amount of a basic substance in an organic or organic/aqueous solvent at temperatures between about 20° and 120°C or the boiling temperature of the reaction medium. For example, the compound of general Formula III is heated or boiled for a short period with about an equivalent amount of sodium, potassium or lithium bicarbonate in alkanolic-/aqueous solution, e.g. in hydrous methanol or ethanol; or a compound of general Formula III is reacted at room temperature or with heating with the equimolar amount of an alkali metal alkoxide, e.g. with sodium methoxide in a lower alkanol such as methanol, ethanol or butanol. Weakly basic reagents such as the aforementioned alkali bicarbonates can also be used in excess when the temperature and length of the reaction are so chosen that when the hydrolysis is interrupted, only the 18-hydroxyl group has been set free. Suitable as acyl groups —CO—$R_{10}$ is e.g., acetyl, formyl, propionyl, butyryl, isobutyryl, valeryl, isovaleryl, pivaloyl or benzoyl groups. In $R_2$ as well as in $R_3$, $R_4$ and $R_5$ there may be acyl groups identical with or differing from —CO—$R_{10}$, but in the latter case —CO—$R_{10}$ should be more readily split off than the other acyl groups.

The possibility of partially hydrolyzing the polyacyloxy compound of general Formula III in order to protect the 20-hydroxyl group during the subsequent oxidation of the 18-hydroxyl group which has been set free, is an important prerequisite for the success of the entire reaction sequence leading from the compounds of general Formula III to the compound of general Formula II and thus also for the production of the final products of general Formula I. That the compounds of general Formula III could be partially hydrolyzed, was in no way predictable, for according to A. L. Nussbaum, F. E. Carlon, E. P. Oliveto, E. Townley, P. Kabasakalian and D. H. R. Barton, Tetrahedron 18 (1962), 373–378, especially the upper part of page 375, the selective protection of one or the other of the two hydroxyl groups in the positions 18 and 20 in -dihydroxy--di-hydroxy-4-pregnen-3-one is not possible.

The oxidation according to step (b), in which the 18-hydroxy group is converted into the oxo radical thus forming an aldehyde group, can be performed e.g. by means of a 6-valent chromium compound, e.g. with a slight excess of a solution of chromium trioxide in hydrous sulphuric acid in acetone as reaction medium in the cold, furthermore also with chromium trioxide in pyridine. When ketal groups and/or a 3β-alkoxy group together with a 3α, 9α-epoxy radical are present, special care should be taken, when using chromium trioxide/sulphuric acid solutions, to maintain a low temperature, preferably at or below 0°C.

The reaction of the compounds of general Formula V according to step (c) with a compound of general Formula VI such as methylamine, ethylamine, n-propylamine, isopropylamine, n-butylamine, isobutylamine, benzylamine or ammonia, takes place e.g. at temperatures between about 80° and 150°C in an inert organic solvent such as benzene, toluene, methanol, ethanol or butanol, and if necessary in a closed vessel, depending on the boiling point of the compound of general Formula VI and of the solvent as well as on the reaction temperature. The compound of general Formula VI is preferably used in excess and can optionally be used as sole reaction medium. In the reaction according to the process, aminolysis of acyloxy groups which readily split off also occurs. The hydroxyl groups which have been set free are then optionally again acylated in the same manner as given for the hydroxyl groups of the end products, for example with an acetanhydride/pyridine mixture at room temperature. If desired, the hydroxyl groups which have been set free can be left free for the next steps and reacylated only after step e) or f).

The following reduction, step (d), of the imino compounds of general Formula VII is e.g. performed with sodium boro-hydride in aqueous methanol at temperatures between about 0° and 70°C, preferably at room temperature.

For the introduction of the halogeno-acetyl group into the secondary or primary 18-amino group, step (e), for example, a halogeno-acetyl halide or halogeno-acetanhydride, such as chloro-acetyl chloride, bromo-acetyl chloride, bromo-acetyl bromide, chloro-acetanhydride, bromo-acetanhydride, in an inert organic solvent, e.g. a hydrocarbon or halogenated hydrocarbon such as benzene or chloroform, is employed, whereby there is added as acid-binding agent, e.g., an aqueous alkali-metal hydroxide solution as second phase, as well as a solid inorganic basic substance such as potassium or sodium carbonate, or an organic base such as N-ethyl-diisopropylamine, triethylamine, sym. collidine or pyridine. The reaction is preferably performed at temperatures between 0° and about 60°C, whereby an excess of halogeno-acetylating agent should be avoided when there are free secondary hydroxyl groups present in the starting material.

For the cyclisation of the compounds of the above general formula IX according to step f), metal hydroxides are preferably used as basic metal compounds, such as: silver hydroxide, sodium or potassium hydroxide solution, basic metal salts such as sodium and potassium carbonate, or sodium and potassium bicarbonate, alkali metal alcoholates such as, e.g. sodium methylate, sodium ethylate or potassium-tert.butylate, metal hydrides such as sodium hydride, calcium hydride or lithium aluminium hydride. The solvents used for the reaction according to the process are, preferably, aliphatic, cyclic or aromatic hydrocarbons, especially benzene or toluene, ethers such as, e.g. diethyl ether, tetrahydrofuran, dioxane, or also dimethylsulphoxide, dimethylformamide and/or alcohols such as, e.g. methanol, ethanol or tert.butanol. An advantageous embodiment of the cyclisation is the reaction of the starting materials with sodium hydride in a mixture, preferably 1:1, of benzene and tetrahydrofuran in the presence of catalytic amounts of an alcohol, especially methanol or ethanol.

The conversion of the lactams of the general formula X into the corresponding thiolactams of the general formula IIa is performed by heating with phosphorus pentasulfide to temperatures of ca. 100°–150°C in an inert organic solvent. Preferably, the lactams of the general formula X are refluxed in a solvent of suitable boiling point, such as, e.g. dioxane, toluene, xylene, collidine and, in particular, pyridine for ca. half an hour to several hours.

Compounds of the general formula III can be produced from various known starting materials by sequences — with a few exceptions — of reactions known per se. Two examples of such reaction sequences are as follows:

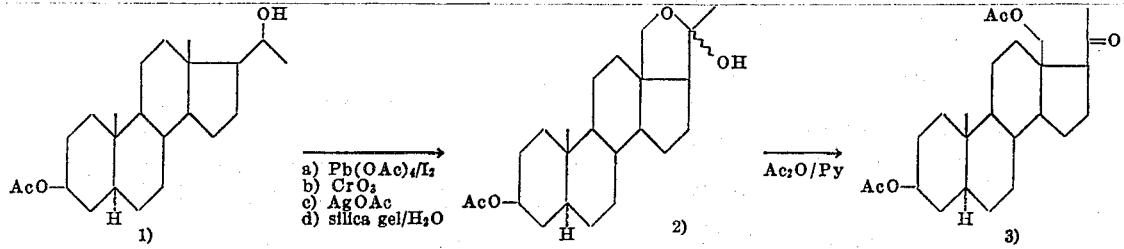

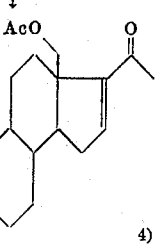 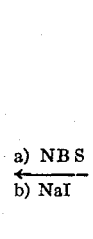 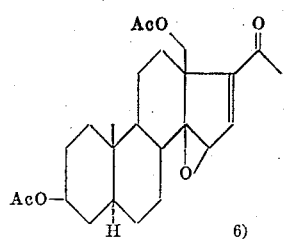
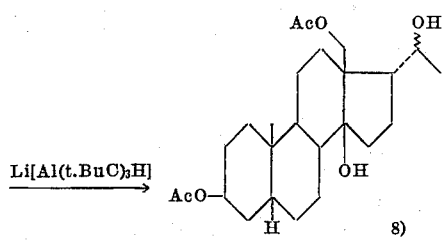 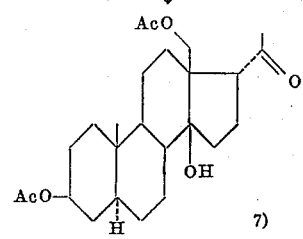
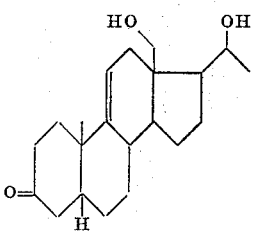 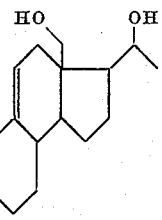 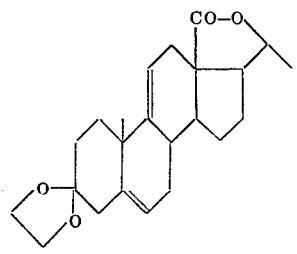
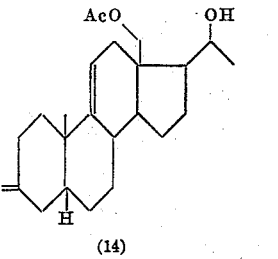 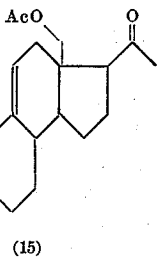 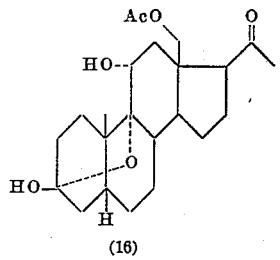
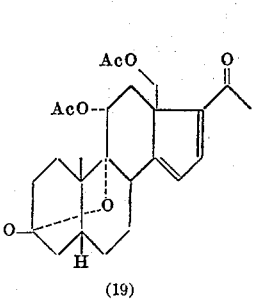 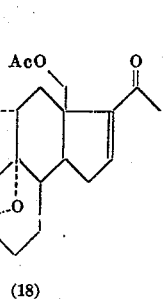 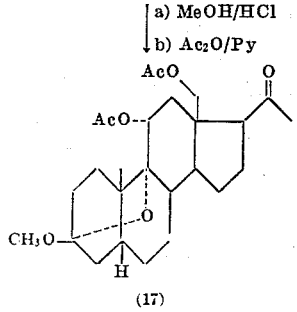
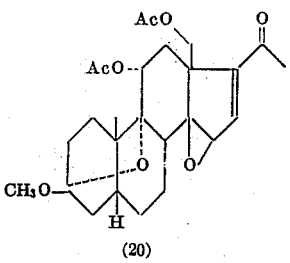 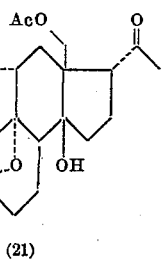 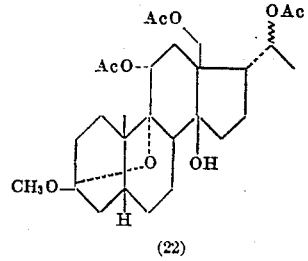
embraced by Formula III According to the first reaction sequence, the starting compound is 3β-acetoxy-20β-hydroxy-5α-pregnane (1), which can be substituted as defined. Compounds of this type are described in the literature. By oxidation with lead tetraacetate in the presence of iodine in cyclohexane, and re-oxidation with $CrO_3$, and subsequent reaction with silver acetate followed by an aftertreatment with silica gel/water, is obtained 3β-acetoxy-18,20-oxido-20 ξ-hydroxy-5α-pregnane (2). Treatment of (2) with acetic anhydride/pyridine, at elevated temperature, yields 3β,18-diacetoxy-20-oxo-5α-pregnane (3), which can be converted by bromination with pyridinium hydrobromide-perbromide and subsequent dehydrobromination with dimethyl formamide into 3-β,18-diacetoxy-20-oxo-$\Delta^{16}$-5α-pregnene (4). A repeated bromination with N-bromo-succinimide and dehydrobromination with sodium iodide in acetone yield 3β,18-diacetoxy-20-oxo-$\Delta^{14,16}$-5α-pregnadiene (5). Epoxidation with p-nitroperbenzoic acid yields 3-β,18-diacetoxy-14β,15β-epoxy-20-oxo-$\Delta^{16}$-5α-pregnene (6), which is converted by catalytic hydrogenation in ethanol, in the presence of palladium on barium sulphate, into 3β,18-diacetoxy-14β-hydroxy-20-oxo-5α,17α-pregnane (7). Reduction with lithium-aluminium-tritert.butoxyhydride subsequently leads to 3β,18-diacetoxy-14β,20 ξ-dihydroxy-5α,17α-pregnane (8), which can be acetylated to 3β,18,20 ξ-triacetoxy-14β-hydroxy-5α,17α-pregnane (9). The latter is embraced by the general Formula III.

In the second reaction sequence, the starting compound, (20R)-3-ethylenedioxy-20-hydroxy-$\Delta^{5,9(11)}$-pregnadien-18-acid lactone-(20) (11), which is also known, is first reduced with lithium aluminium hydride to the 18,20-dihydroxy compound. The subsequent cleaving of the 3-ethylenedioxy group with a little hydrochloric acid in acetic acid/methanol leads to (20R)-3-oxo-18,20-dihydroxy-$\Delta^{4,9(11)}$-pregnadiene (12), which is hydrogenated with the calculated amount of hydrogen in the presence of a palladium/charcoal catalyst to (20R)-3-oxo-18,20-dihydroxy-$\Delta^{9(11)}$-5β-pregnene (13). Partial acetylation thereof with acetanhydride/pyridine at room temperature leads to (20R)-3-oxo-18-acetoxy-20-hydroxy-$\Delta^{9(11)}$-5β-pregnene (14), which is oxidized with chromium trioxide/sulphuric acid in acetone to 3,20-dioxo-18-acetoxy-$\Delta^{9(11)}$-5β-pregnene (15). On treatment of the latter with osmium tetroxide in pyridine at room temperature and darkness, after several days there is surprisingly obtained 3β,11α-dihydroxy-3α,9α-epoxy-18-acetoxy-20-oxo-5β-pregnane (16). This is in contrast to the statement made by L. F. Fieser in "Steroids," Reinhold Publishing Corporation, New York, 1959, page 669, according to which $\Delta^{9(11)}$-5β-steroids cannot be reacted with osmium tetroxide.

The cyclic hemiketal (16) is first converted with methanolic hydrogen chloride to the ketal and then acetylated with acetanhydride/pyridine to obtain 3β-methoxy-3α,9α-epoxy-11α,18-diacetoxy-20-oxo-5β-pregnane (17). On bromination with N-bromo-succinimide in 17-position and cleaving hydrogen bromide by means of lithium carbonate/lithium bromide, 3β-methoxy-3α,9α-epoxy-11α,18-diacetoxy-20-oxo-$\Delta^{16}$-5β-pregnene (18) is obtained. Repetition of the two latter reactions yields 3β-methoxy-3α,9α-epoxy-11α,18-diacetoxy-20-oxo-$\Delta^{14,16}$-5β-pregnadiene (19). Treatment thereof with p-nitro-perbenzoic acid in chloroform/methanol leads to 3β-methoxy-3α,9α:14β,15β-diepoxy-11α,18-diacetoxy-20-oxo-$\Delta^{16}$-5β-pregnene (20), from which, by thorough hydrogenation in the presence of palladium/barium sulphate catalyst in ethanol, 3β-methoxy-3α,9α-epoxy-11α,18-diacetoxy-14β-hydroxy-20-oxo-5β,17α-pregnane (21) is obtained. This is finally converted by reduction with sodium boro-hydride in methanol/water and subsequent acetylation with acetanhydride/pyridine into 3β-methoxy-3α,9α-epoxy-11α,18,20ξ-triacetoxy-14β-hydroxy-5β,17α-pregnane (22), which is embraced by the general Formula III.

The above reaction sequences can also be performed analogously with compounds which instead of the 3-acetoxy or 3-ethylene-dioxy group have other protected hydroxyl groups or oxo radicals falling under the definition for $R_3$.

Analogous to the second reaction sequence, the starting materials having a protected functional group corresponding to the definition of $R_4'$ in 7-position can also be converted into compounds of general Formula III, whereby the functional group in 7-position can be left or can be used to introduce a double bond into the 7,8-position. It is, e.g., likewise possible to reintroduce a double bond into the 16,17-position analogously to the conversion of the compound (17) into the compound (18) in the second reaction sequence.

The compounds of the general formula IIb can be prepared by cyclisation of a compound of the general formula XI

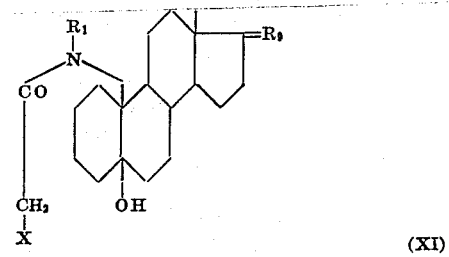

(XI)

wherein
X represents a halogen atom, e.g. chlorine, bromine or iodine,
and $R_1$ and $R_9$ have the meanings given under formula I or Ib respectively, and the substituents and double bonds mentioned there can be present, which cyclisation is effected by reaction with a basic metal compound in the presence of an organic solvent which is inert and/or one containing hydroxyl groups analogously to step f) of the reaction sequence mentioned hereinbefore and leads to a lactam of the general formula XII

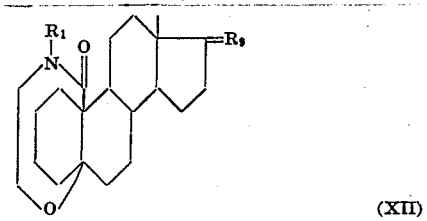

(XII)

wherein $R_1$ and $R_9$ have the meanings given under formula I or Ib respectively and the substituents and double bonds mentioned there can be present, and heating the lactam of the general formula XII in an organic solvent analogously to step g) of the reaction sequence mentioned hereinbefore.

The compounds of the general formula XI to be used as starting materials can be obtained, for example, according to the following reaction pattern:

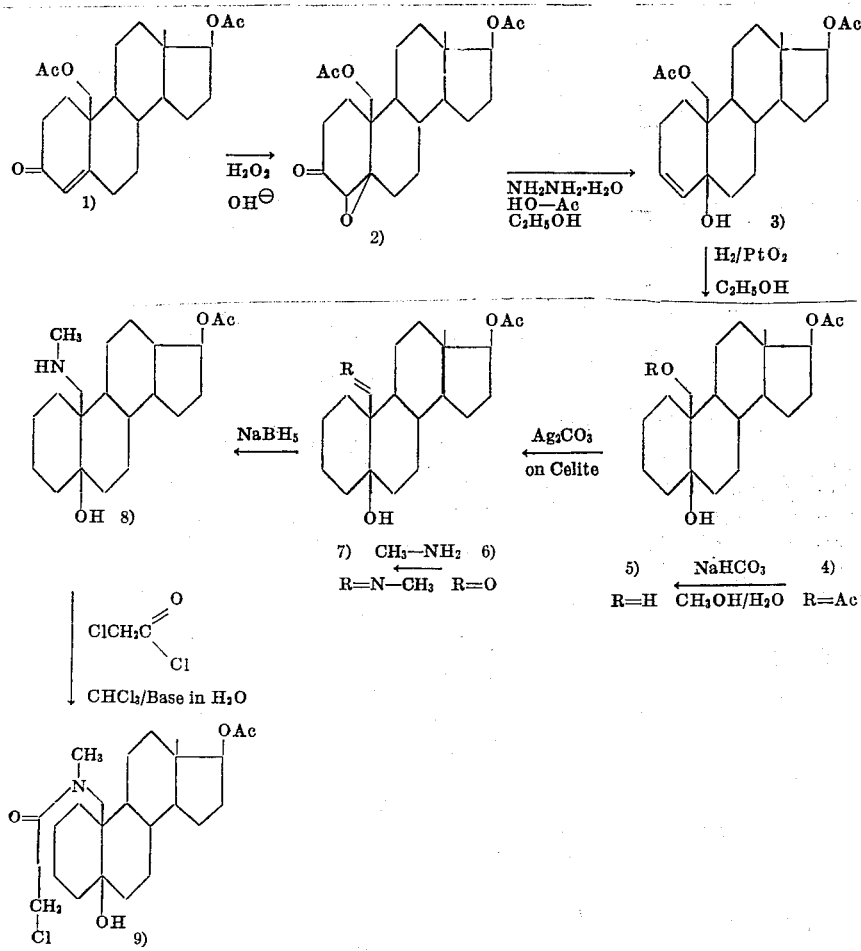

According to this reaction sequence, the starting compound is 3-oxo-17β,19-diacetoxy-Δ⁴-androstene(1), which can be substituted as defined. Compounds of this type are described in the literature. By oxidation with hydrogen peroxide in an alkaline medium and subsequent acetylation is obtained the corresponding 3-oxo-4β,5β-epoxy-17β,19-diacetoxy-androstane(2) which yields, after treatment with hydrazine hydrate and acetic acid in ethanol, 5β-hydroxy-17β,19-diacetoxy-Δ³-androstene(3). By hydrogenation, e.g. in the presence of platinum oxide in ethanol, 5β-hydroxy-17β,19-diacetoxy-androstane (4) is obtained and from that is obtained, by partial hydrolysis with methanolic-aqueous sodium bicarbonate solution, 5β,19-dihydroxy-17β-acetoxy-androstane(5).

The latter is converted, by boiling with silver carbonate on Celite in abs. benzene, into the 5β-hydroxy-17β-acetoxy-19-oxo-androstane(6), which is reacted with methylamine to give 5β-hydroxy-17β-acetoxy-19-(methylimino)androstane(7). Reduction of the latter with sodium borohydride in methanol/water yields 5β-hydroxy-17β-acetoxy-19-(methylamino)-androstane(8), which is acylated with chloroacetyl chloride in chloroform, in the presence of sodium hydroxide solution, to 5β-hydroxy-17β-acetoxy-19-(N-methyl-2-chloroacetamido)-androstane(9), usable as starting material of the general formula XI.

The above reaction sequence can be performed, in an analogous manner, with compounds containing in the 17-position, instead of the 17β-acetoxy group, another functionally modified hydroxyl group within the scope of the above given definition for R₉. It is also possible to start, however, with analogous compounds having a ketalised 17-oxo radical, in order to obtain starting materials of the general formula XI having a protected 17-oxo radical.

Belonging to the object of the invention are also the new starting materials for the present process corresponding to the general formula II and the narrower general formulae IIa and IIb.

As mentioned above, the compounds of the general formula I can also be used as intermediate products for further syntheses. Hydroxyl groups can be set free, e.g. from lower alkanoyloxy groups occuring in the groupings $R_3$, $R_4$, $R_5$ and, particularly, in $R_2$ of the compounds of the general formulae Ia and Ic or in the grouping $R_9$ of the compounds of the general formula Ib respectively, by alkaline hydrolysis. Oxo radicals protected by ketal groupings occuring as $R_3$, $R_4$, $R_5$ and/or $R_2$ or as $R_9$ respectively can be set free by treatment with acids under mild conditions, e.g. with mixtures of 70 percent aqueous perchloric acid and glacial acetic acid at room temperature. Under the same conditions, an alkoxy group in 3β-position occuring with a 3α,9α-epoxy radical is converted into the hydroxyl group. Liberated oxo radicals can be reduced to hydroxyl groups, e.g., by means of complex hydrides such as sodium boro-hydride or tri-tert-butoxy-lithium aluminium hydride, e.g. in tetrahydrofuran. Liberated hydroxyl groups can be oxidised to oxo groups, by means of the Oppenauer reaction or with the aid of compounds of 6-valent chromium, e.g. chromium trioxide in pyridine. Liberated hydroxyl groups can be esterified in a known manner, e.g. by treatment with an acid halide or acid anhydride derived from a lower alkanoic acid, in the presence of a tertiary base such as pyridine. Esters of optionally alkyl-substituted pyrrole carboxylic acids and of products of the hydrolysis of compounds of the general formula Ia, which products contain a free hydroxyl group in position 20 and preferably a double bond in position 16, 17, are obtained, in particular, by reaction of such 20-hydroxy compounds with mixed anhydrides of optionally alkyl-substituted pyrrole carboxylic acids and lower alkoxyformic acids at room temperature in a biphasic system consisting of an organic solvent immiscible with water, e.g. methylenechloride, chloroform or benzene, and aqueous sodium hydroxide or potassium hydroxide solution.

Optionally, the new compounds of the general Formula I obtained according to the invention are converted in the usual manner into their acid addition salts with inorganic and organic acids. For example, to a solution of a corresponding compound of the general Formula I in an organic solvent such as benzene, diethyl ether, methanol, ethanol or acetone, is added the acid desired as the salt component, or a solution of the acid, and the salt, which has precipitated immediately or after the addition of a second organic liquid such as, e.g. diethyl ether to methanol, is separated. Liberation of the bases from their acid addition salts is likewise performed in the usual manner by reaction with basic substances such as, e.g. sodium carbonate or sodium bicarbonate.

For use as active substances for pharmaceutical preparations it is possible to employ, instead of free basic compounds of the general Formula I, pharmaceutically acceptable acid addition salts thereof, i.e. salts with such acids, the anions of which exhibit, in the case of the dosages in question, either no inherent pharmacological action or a desired one. Furthermore, it is of advantage if the salts to be used as active substances crystallize well and are not, or only slightly, hygroscopic. For salt formation with compounds of the general Formula I suitable for the purpose, it is possible to use, e.g. hydrochloric acid, hydrobromic acid, sulphuric acid, phosphoric acid, methanesulphonic acid, ethanesulphonic acid, $\beta$-hydroxyethanesulphonic acid, acetic acid, malic acid, tartaric acid, citric acid, lactic acid, succinic acid, fumaric acid, maleic acid, benzoic acid, salicylic acid, phenylacetic acid, mandelic acid, embonic acid or 1,5-naphthalene-disulphonic acid. The pharmacologically active compounds of the general formula I of the present application or their pharmaceutically acceptable acid addition salts can be combined with pharmaceutical carriers to yield pharmaceutical preparations for application in human or veterinary medicine.

Used as carriers are organic or inorganic substances which are suitable for enteral administration, e.g. oral, parenteral, or topical administration. Suitable for the formation thereof are such substances which do not react with the new compounds, such as e.g. water, gelatine, lactose, starch, magnesium stearate, talcum, vegetable oils, benzyl alcohols, rubber, polyalkylene glycols, vaselines, cholesterol and other known medicament-carriers. The pharmaceutical preparations can be in solid form, e.g. as tablets, dragees or capsules; or in liquid or semi-liquid form as solutions, suspensions, emulsions, ointments or creams. Optionally, these pharmaceutical preparations are sterilized and/or they contain auxiliaries such as preservatives, stabilizers, wetting or emulsifying agents, salts for modifying the osmotic pressure, or buffers. They can also contain other therapeutically valuable substances. The new substances can also serve as starting products for the production of other valuable compounds.

The compounds of the general Formula I can also be used as animal-feed additives.

The invention is described in more detail in the following examples; these in no way limit, however, the scope of the invention. The temperatures are given in degrees Centigrade. The rotations are measured in chloroform; concentrations are given in parenthesis. The IR spectra are measured in chloroform, or in another solvent given in parenthesis; the absorption bands are given in cm$^{-1}$. The UV spectra are taken in ethanol; absorption maxima are stated in nm, $\xi$-values are in parenthesis.

Celite is a tradename of the Johns-Manville International Corp., New York.

EXAMPLE 1

An amount of 90 mg of crude 1'-methyl-2'-thioxo-3$\beta$,20$\xi$-diacetoxy-14$\beta$,18-(epoxyethanoimino)-5$\alpha$,17$\alpha$-pregnane (see Example 4) is stirred with 1 g of Raney nickel in 10 ml of ethanol for 15 minutes at room temperature. The Raney nickel is then filtered off, the filtrate concentrated in vacuo, and the obtained crude product, dissolved in ethyl acetate/methanol (9:1), chromatographed on silica gel. In this manner are obtained 75 mg of 1'-methyl-3$\beta$,20$\xi$-diacetoxy-14$\beta$,18-(epoxyethanoimino)-5$\alpha$,17$\alpha$-pregnane. After recrystallisation twice from methanol/water, the obtained product has a M.P. of 198°–200° (decomposition). [$\alpha$]$_D$ = $-$ 51° (0.37). IR: 1730, 1250.

EXAMPLE 2

An amount of 80 mg of 1'-methyl-2'-thioxo-3$\beta$-methoxy-3$\alpha$,9$\alpha$-epoxy-11$\alpha$,20$\xi$-diacetoxy-14$\beta$,18-(epoxyethanoimino)-5$\beta$,17$\alpha$-pregnane (see Example 5) is reacted, analogously to Example 1, with 1 g of Raney nickel. The obtained crude product is chromatographed on silica gel in a cyclohexane/chloroform/methanol/triethylamine mixture (16:4:1:1). In this way are obtained 68 mg of amorphous 1'-methyl-3$\beta$-methoxy-3$\alpha$,9$\alpha$-epoxy-11$\alpha$,20$\xi$-diacetoxy-14$\beta$,18-(epoxyethanoimino)-5$\beta$,17$\alpha$-pregnane. IR: 1725, 1250, 1100, 1005, 960.

EXAMPLE 3

An amount of 50 mg of 1'-methyl-3$\beta$-methoxy-3$\alpha$,9$\alpha$-epoxy-11$\alpha$,20$\xi$-diacetoxy-14$\beta$,18-(epoxyethanoimino)-5$\beta$,17$\alpha$-pregnane (see Example 2) is refluxed in 5 ml of boiling 5 percent methanolic potassium hydroxide solution for 2 hours. The reaction solution is diluted with ethyl acetate, washed with saturated aqueous sodium chloride solution, dried with magnesium sulphate, and concentrated in vacuo. By this means are obtained 38 mg of 1'-methyl-3$\beta$-methoxy-3$\alpha$,9$\alpha$-epoxy-11$\alpha$,20$\xi$-dihydroxy-14$\beta$,18-(epoxyethanoimino)-5$\beta$,17$\alpha$-pregnane, which melts at 175°–176° after two crystallisations from acetone/water. [$\alpha$]$_D$ = + 12° (0.25 in ethanol). IR: 3560, 3250, 2860, 2800, 1100, 1030, 1000, 955.

EXAMPLE 4

The 1'-methyl-2:-thioxo-3$\beta$,20$\xi$-diacetoxy-14$\beta$,18-

(epoxyethanoimmo)-5α,17β-pregnane used in Example 1 as starting material can be produced in the following manner:

a. 100 g of lead tetracetate are dried for 2 hours in darkness at room temperature. To this are then added 20 g of dry calcium carbonate, and the mixture is refluxed for one hour, with stirring, in 1700 ml of abs. cyclohexane. To this boiling suspension is thereupon added, with vigorous stirring, a hot solution of 21.8 g of 3β-acetoxy-20β-hydroxy-5α-pregnane in 500 ml of abs. cyclohexane and 7.7 g of solid iodine; the reaction mixture is then boiled for a further 30 minutes with vigorous stirring, while externally irradiating with a 1,000 Watt incandescent lamp. A practically complete decolouration of the iodine-containing reaction mixture is thereby observed. After cooling, the mixture is filtered through cotton wool, and the filtrate concentrated in vacuum. The concentration-residue is oxidized for 30 minutes in 800 ml of acetone, at a temperature of ca. 5°, with an excess of an 8 N solution of chromium trioxide in 8 N sulphuric acid. 20 ml of isopropanol is then added, the whole diluted with ethyl acetate, and washed until neutral with saturated aqueous sodium chloride solution. The crude product obtained after drying and concentration by evaporation of the organic phase is refluxed for 3 hours with stirring, in 1,500 ml of abs. methanol with 25 g of silver acetate. The mixture is afterwards filtered through cotton wool, concentrated in vacuum, dissolved in ether, and filtered on neutral aluminium oxide (Act. III). The thereby obtained crude product is chromatographed on 2 kg of silica gel, Merck (grain size 0.05 – 0.2 mm), which has been previously deactivated with 200 ml of water. With a benzene/ethyl acetate mixture (10:1) are thereby eluted 7.5 g of 3β-acetoxy-18,20-epoxy-20ξ-hydroxy-5α-pregnane, M.P. 169° (twice recrystallized from acetone/hexane). $[\alpha]_D = + 33°$ (0.45). IR: 3590, 1725, 1250.

b. 1 g of 3β-acetoxy-18,20-epoxy-20ξ-hydroxy-5α-pregnane is dissolved in a mixture of 7 ml of pyridine and 7 ml of acetanhydride, and the solution obtained is heated in a nitrogen atmosphere for 10 hours to 95°. The solution is allowed to cool; it is then diluted with ethyl acetate, and washed successively with 2 N aqueous hydrochloric acid, saturated aqueous sodium chloride solution, saturated aqueous sodium bicarbonate solution, and again with saturated aqueous sodium chloride solution until the neutral point is attained. The solution is then dried with magnesium sulphate, concentrated in vacuum, and chromatographed on the 100-fold amount of silica gel which has been deactivated previously again with 10 percent water. With benzene/ethyl acetate mixture (10:1) are thereby firstly eluted 395 mg of 3β,18-diacetoxy-20-oxo-5α-pregnane; M.P. 107° after two crystallizations from acetone/hexane. $[\alpha]_D = + 70°$ (0.46). IR: 1740, 1710, 1240 (in $CCl_4$). Subsequent fractions consisted of 386 mg of unmodified 3β-acetoxy-18,20-epoxy-20ξ-hydroxy-5α-pregnane.

c. An amount of 1.04 g of 3β,18-diacetoxy-20-oxo-5α-pregnane is brominated in 50 ml of dichloromethane with 1.13 g of 90 percent pyridinehydrobromideperbromide for 30 minutes at room temperature whilst stirring is maintained. The reaction mixture is then diluted with ethyl acetate, repeatedly washed with saturated aqueous sodium chloride solution, dried over magnesium sulphate, and evaporated in vacuum. Thereby obtained are 1.23 g of crude 3β,18-diacetoxy-17ξ-bromo-20-oxo-5α-pregnane which is advantageously dehydrobrominated, without any purification, by three hours boiling in 20 ml of abs. dimethyl formamide under nitrogen. After cooling, the product is diluted with ethyl acetate and washed at least five times with water. The organic phase is then dried with magnesium sulphate, and evaporated in vacuum. The obtained crude product is first filtered in dichloromethane solution on neutral aluminium oxide (Act. III), and afterwards chromatographed in benzene/ethyl acetate solution (6:1) on silica gel. By this means are obtained 860 mg of 3β,18-diacetoxy-20-oxo-$\Delta^{16}$-5α -pregnene which, after two crystallizations from acetone/hexane, melts at 135°. $[\alpha]_D = + 44°$ (0.35). IR: 1725, 1670, 1590, 1250. UV: 238 ($\epsilon = 8920$).

d. An amount of 800 mg of 3β,18-diacetoxy-20-oxo-$\Delta^{16}$-5α-pregnene is refluxed for 1 hour, with stirring, with 650 mg of N-bromosuccinimide in 50 ml of carbon tetrachloride in the presence of 50 mg of azo-bis-isobutyronitrile. The mixture is allowed to cool; it is then filtered off from the succinimide which has crystallized out, subsequently washed with carbon tetrachloride, and evaporated in vacuum. The crude bromination product is afterwards boiled for 3 hours with 1 g of sodium iodide in 100 ml of acetone, the whole concentrated in vacuo to ca. 25 ml, diluted with ethyl acetate, and successively washed with aqueous solutions of sodium thiosulphate and sodium chloride. The organic phase dried over magnesium sulphate is concentrated in vacuum, and the crude product chromatographed in benzene/ethyl acetate solution (6:1) on silica gel. Thus obtained are 512 mg of oily 3β,18-diacetoxy-20-oxo-$\Delta^{14,16}$-5α-pregnadiene. IR: 1735, 1650, 1530, 1240 ($CCl_4$). UV: 312 ($\epsilon = 6250$).

e. To 976 mg of 3β,18-diacetoxy-20-oxo-$\Delta^{14,16}$-5α-pregnadiene in 40 ml of chloroform there are added 488 mg of p-nitroperbenzoic acid, and the mixture is stirred in darkness for 19 hours at room temperature. The mixture is then diluted with ethyl acetate, and successively washed with aqueous solutions of potassium iodide, sodium thiosulphate, sodium chloride, sodium bicarbonate, and again sodium chloride, until the neutral point is attained. The ethyl acetate phase dried with magnesium sulphate is concentrated in vacuum in a rotary evaporator, and the crude product chromatographed in benzene/ethyl acetate solution (4:1) on silica gel. In this manner are obtained 550 mg of 3β,18-diacetoxy-14β,15β-epoxy-20-oxo-$\Delta^{16}$-5α-pregnene, M.P. 128°–129° (twice crystallized from acetone/hexane). $[\alpha]_D = + 62°$ (0.42). IR: 1725, 1670, 1600, 1250. UV: 249 ($\epsilon = 8270$).

f. An amount of 300 mg of 3β, 18-diacetoxy-14β,15β-epoxy-20-oxo-$\Delta^{16}$-5α-pregnene is exhaustively hydrogenated in 80 ml of ethanol in the presence of 100 mg of 5 percent palladium on barium sulphate at room temperature and under normal pressure. After completion of the hydrogen absorption, the catalyst is separated by filtration, and the filtrate is evaporated in vacuum. The crude hydrogenation product is then filtered on neutral aluminium oxide (Act. III). Thus obtained are 282 mg of oily 3β,18-diacetoxy-14β-hydroxy-20-oxo-5α,17α- pregnane. IR: 3600–3200 broad, 1735, 1240 (CCl₄).

g. An amount of 282 mg of 3β,18-diacetoxy-14β-hydroxy-20-oxo-5α,17α-pregnane is stirred in 40 ml of tetrahydrofuran with 430 mg of lithium aluminium tritert.butoxy-hydride for 5 hours at room temperature. The excess hydride is then decomposed with 5 percent aqueous acetic acid (ca. 2 ml), diluted with ethyl acetate and washed successively with aqueous solutions of sodium bicarbonate and sodium chloride until the neutral point is attained. The crude product obtained after drying and concentration in vacuum is chromatographed in benzene/ethyl acetate solution (1:1) on silica gel, whereby 217 mg of oily 3β,18-diacetoxy-14β,20ξ-dihydroxy-5α,17α-pregnane are eluted. IR: 3600–3300 broad, 1735, 1240 (CCl₄).

h. 150 mg of 3β,18-diacetoxy-14β,20ξ-dihydroxy-5α,17α-pregnane are allowed to stand in 10 ml of pyridine/acetanhydride mixture (1:1) for 16 hours at room temperature. The acetylation mixture is then concentrated in vacuum, whereby 155 mg of chromatographically homogeneous oily 3β,18,20ξ-triacetoxy-14β-hydroxy-5α,17α-pregnane are obtained. IR: 3580, 1735 1240 (CCl₄).

i. An amount of 150 mg of 3β,18,20ξ-triacetoxy-14β-hydroxy-5α,17α-pregnane is hydrolyzed in a mixture of 32 ml of methanol and 3.5 ml of aqueous 1 percent sodium bicarbonate solution for 5 minutes at boiling temperature. The solution is then neutralized with glacial acetic acid, diluted with ethyl acetate, and washed until neutral with aqueous sodium chloride solution. The crude product remaining behind after concentration by evaporation is chromatographed in benzene/ethyl acetate solution (1:1) on silica gel. Firstly eluted thereby are 38 mg of unmodified starting material, there then follow 67 mg of transistion fractions, and afterwards 49 mg of 3β,20ξ-diacetoxy-14β,18-dihydroxy-5α,17α-pregnane, M.P. 180°–181° (twice crystallized from acetone/hexane). [α]$_D$ = −7° (0.46). IR: 3600–3300, 1730, 1240 (CCl₄).

j. 95 mg of 3β,20ξ-diacetoxy-14β,18-dihydroxy-5α,17α-pregnane are oxidized in 10 ml of acetone at 0° for 2 minutes, with stirring, with an excess of an 8 N solution of chromium trioxide in 8 N sulphuric acid. The chromium trioxide excess is then decomposed by the addition of 2 ml of isopropanol. The reaction mixture is taken up in ethyl acetate, and washed with saturated aqueous sodium chloride solution until a neutral, colourless organic phase results. After drying and concentration thereof in vacuum, 85 mg of crude product are obtained, which are chromatographed in benzene/ethyl acetate solution (1:1) on silica gel. Eluted thereby are 65 mg of 3β,20ξ-diacetoxy-14β-hydroxy-18-oxo-5α,17α-pregnane which, after two crystallizations from acetone/hexane, melts at 170°–171°. [α]$_D$ = 0° (0.42). IR: 3610, 3480, 2720, 1735, 1720 + 1710 (double bands for the aldehydecarbonyl), 1240 (CCl₄).

k. An amount of 270 mg of 3β,20ξ-diacetoxy-14β-hydroxy-18-oxo-5α,17α-pregnane is heated with 50 ml of methylamine in 50 ml of abs. benzene for 15 hours in a bomb tube to 120°. The mixture is concentrated in vacuo, dissolved in 10 ml of acetanhydride/pyridine mixture (1:1), allowed to stand for 3 hours at room temperature, and concentrated in vacuum, whereby 260 mg of 3β,20ξ-diacetoxy-14β-hydroxy-18-(methylimino)-5α,17α-pregnane are obtained. IR: 3300 broad, 2760, 1730, 1655, 1240 (CCl₄).

l. The methylimino compound obtained according to (k) is reduced in 50 ml of methanol with 300 mg of sodium borohydride in 10 ml of water at 20° for 20 minutes. To the reaction mixture is then added ethyl acetate, the whole washed until neutral with saturated aqueous sodium chloride solution, and concentrated by evaporation, whereby 280 mg of 3β,20ξ-diacetoxy-14β-hydroxy-18-(methylamino)-5α,17α-pregnane are obtained. IR: 3500–2600 broad, 1730, 1250.

m. The methylamino compound obtained according to (l) is dissolved together with 135 mg of chloroacetyl chloride in 50 ml of chloroform. To the solution are added at 0°, with vigorous stirring, 48 mg of sodium hydroxide in 10 ml of water. After 10 minutes the solution is diluted with more chloroform, the organic phase separated, washed with saturated aqueous sodium chloride solution until neutral, dried with magnesium sulphate, concentrated in vacuum, and the residue chromatographed in ethyl acetate on silica gel. In this manner are obtained 186 mg of 3β,20ξ-diacetoxy-14β-hydroxy-18-(N-methyl-2-chloroacetamido)-5α,17α-pregnane, M.P. 194°–196°. IR: 3380 broad, 1730, 1640, 1250.

n. 150 mg of 3β,20ξ-diacetoxy-14β-hydroxy-18-(N-methyl-2-chloroacetamido)-5α,17α-pregnane are dissolved in 18 ml of absolute tetrahydrofuran and 18 ml of absolute benzene; to the obtained solution are added, one after the other, 80 mg of sodium hydride and 0.3 ml of a solution of 160 mg of ethanol in 100 ml of absolute tetrahydrofuran. The mixture is stirred for 3 hours at 50°; to the reaction mixture is then added ethyl acetate, and the whole washed until neutral with saturated aqueous sodium chloride solution. The crude product remaining behind after concentration by evaporation is chromatographed in ethyl acetate on silica gel. By this means are obtained 105 mg of 1'-methyl-2'-oxo-3β,20ξ-diacetoxy-14β,18-(epoxyethanoimino)-5α,17α-pregnane. After two crystallizations from acetone/hexane, the melting point is 251°–252°. IR: 1730, 1650, 1250. [α]$_D$ = −100° (0.46).

o. 100 mg of 1'-methyl-2'-oxo-3β,20ξ-diacetoxy-14β,18-(epoxyethanoimino)-5α,17α-pregnane are refluxed with 300 mg of freshly sublimated phosphorus pentasulphide, in a nitrogen atmosphere, in 8 ml of abs. pyridine for 3 hours. The mixture is then cooled and allowed to stand for 3 hours at room temperature; an amount of 40 ml of methylene chloride is afterwards added and the whole stirred for a further 15 minutes at room temperature. The mixture is subsequently diluted with further methylene chloride, washed twice with saturated aqueous sodium chloride solution, dried with magnesium sulphate, and concentrated in vacuo. In this manner are obtained 92 mg of 1'-methyl-2'-thioxo-3β,20ξ-diacetoxy-14β,18-(epoxyethanoimino)-5α,17α-pregnane [IR: 1730, 1515, 1250], which is further used without purification.

EXAMPLE 5

The 1'-methyl-2'-thioxo-3β-methoxy-3α, 9α-epoxy-11α,

20ξ-diacetoxy-14β,-18-(epoxyethanommino)-5β,17α-pregnane, used as starting material in Example 2, can be produced as follows:

a. 10 g of (20R)-3-ethylenedioxy-20-hydroxy-Δ$^{5,9(11)}$-pregnadien-18-acid lactone-(20) are boiled in 300 ml of absolute tetrahydrofuran with 7 g of lithium aluminium hydride for 2 hours. Then the excess hydride is decomposed with about 5 ml of saturated aqueous ammonium sulphate solution while cooling with ice. Then 20 g of Celite are added and stirred for 30 minutes at room temperature; the aluminium hydroxide/Celite mixture is removed by filtration, rinsed with ethyl acetate, and the filtrate is concentrated by evaporation in vacuum to yield 9.7 g of (20R)-3-ethylenedioxy-18,20-dihydroxy-Δ$^{5,9(11)}$-pregnadiene which, after a crystallization from methylene chloride/hexane, melts at 201°. $[\alpha]_D = -35°$ (0.49). IR : 3600, 3500–3200.

b. 10.7 g of (20R)-3-ethylenedioxy-18,20-dihydroxy-Δ$^{5,9(11)}$-pregnadiene are refluxed for 2 hours in 1500 ml of acetone and 100 ml of water with 1.5 g of p-toluene-sulphonic acid. The reaction solution is then concentrated under vacuum to about 500 ml. By careful addition of water to this solution, the desired (20R)-3-oxo-18,20-dihydroxy-Δ$^{4,9(11)}$-pregnadiene precipitates as crystals. These are then suction filtered, washed neutral with a large amount of water, dried, and recrystallized once from methanol/water to yield 7 g of crystals having a melting point of 194°. $[\alpha]_D = +59°$ (0.61). IR: 3600, 3550–3100, 1660, 1615. UV: 244 (16700).

c. 7 g of (20R)-3-oxo-18,20-dihydroxy-Δ$^{4,9(11)}$-pregnadiene are hydrogenated in 250 ml of 0.1 N ethanolic potassium hydroxide solution in the presence of 1 g of 5 percent palladium/charcoal catalyst with one equivalent of hydrogen. After the calculated amount of hydrogen has been taken up, the hydrogenation is interrupted, and the catalyst is removed from the solvent by filtration. By the careful addition of water to the filtrate, (20R)-3-oxo-18,20-dihydroxy-Δ$^{9(11)}$-5β-pregnene precipitates as crystals. After suction filtration, washing neutral with a large amount of water, drying in vacuum and recrystallization from methanol/water, 6.7 g of pure crystallization product having a melting point of 198° are obtained. $[\alpha]_D = -2°$ (0.49). IR: 3600, 3550–3200, 1705.

d. 5.1 g of (20R)-3-oxo-18,20-dihydroxy-Δ$^{9(11)}$-5β-pregnene in 60 ml of pyridine and 40 ml of acetanhydride are allowed to stand for one hour at room temperature. Then the excess acetanhydride is decomposed by the careful addition of 80 ml of methanol, the temperature being kept at about 0° by the addition of solid carbon dioxide in portions. Then the reaction mixture is left to stand for 30 minutes at room temperature, evaporated in vacuum, and the crude product is chromatographed in benzene/ethyl acetate (1:1) on silica gel. First 1.5 g of (20R)-3-oxo-18,20-diacetoxy-Δ$^{9(11)}$-5β-pregnene [IR: 1740–1700, 1250], which can be reconverted into the starting material for the acetylation by alkaline hydrolysis in 5 percent methanolic potassium hydroxide solution. Later fractions yield 2.1 g of (20R)-3-oxo-18-acetoxy-20-hydroxy-Δ$^{9(11)}$-5β-pregnene which, after crystallization from methylene chloride/hexane, melts at 110°. $[\alpha]_D = 0°$ (0.48). IR: 3580, 1730, 1710, 1250. Further fractions yield 2.0 g of unmodified (20R)-3-oxo-18,20-dihydroxy-Δ$^{9(11)}$-5β-pregnene.

e. 1.5 g of (20R)-3-oxo-18-acetoxy-20-hydroxy-Δ$^{9(11)}$-5β-pregnene in 100 ml of acetone are oxidized at room temperature while stirring with an excess of an 8 N solution of chromium trioxide in 8 N sulphuric acid for 15 minutes. Then 5 ml of methanol are added, the mixture is diluted with ethyl acetate, and the organic phase is washed with saturated aqueous sodium chloride solution. After drying and concentration by evaporation, 1.49 g of crude product are obtained which, dissolved in dichloromethane, is filtered through neutral aluminium oxide (Act. III). It is then crystallized from acetone/hexane to yield 1.4 g of 3,20-dioxo-18-acetoxy-Δ$^{9(11)}$-5β-pregnene, M.P. 112°–114°. $[\alpha]_D = +67°$ (0.48). IR: 1745, 1720, 1710, 1230 (CCl$_4$).

f. 1.2 g of osmium tetroxide are added to 1.15 g of 3,-20-dioxo-18-acetoxy-Δ$^{9(11)}$-5β-pregnene in 15 ml of pyridine and allowed to stand for 6½ days in the dark at room temperature. Then the reaction mixture is evaporated to dryness in vacuum with the repeated addition of benzene; the residue is dissolved in 40 ml of freshly distilled dioxane. Then 40 ml of saturated, aqueous ammonium chloride solution are added and hydrogen sulphide is passed through the two-phase system during one hour. 6 g of shredded filter paper are added. After heating for one hour at 70°, the mixture is filtered through Celite and then successively washed with 500 ml of ethyl acetate, 100 ml of methanol, 100 ml of water, 100 ml of dichloromethane and again 500 ml of ethyl acetate. The filtrate is diluted with more ethyl acetate and washed several times with saturated, aqueous ammonium chloride solution. Then the organic phase is dried with magnesium sulphate and concentrated by evaporation in vacuum. 1.23 g of crude product are obtained which, in ethyl acetate/methanol solution (9:1), is chromatographed on silica gel to yield 1.13 g of 3β,11α-dihydroxy-3α,9α-epoxy-18-acetoxy-20-oxo-5β-pregnane [IR: 3600–3200, 1740, 1710, 1230 (CCl$_4$)], which is further processed without purification.

g. 775 mg of 3β,11α-dihydroxy-3α,9α-epoxy-18-acetoxy-20-oxo-5β-pregnane in 30 ml of 0.1 N absolute methanolic hydrogen chloride solution are left for 20 minutes at room temperature. Then the mixture is poured onto a saturated, aqueous sodium bicarbonate solution, extracted with ethyl acetate, and the resulting organic phase is washed several times with saturated, aqueous sodium chloride solution. After drying the solution with magnesium sulphate and concentration by evaporation, the crude product obtained (745 mg) is acetylated in 30 ml of acetanhydride/pyridine mixture (1:1) for 3½ hours at 70°. The reaction mixture is then concentrated by evaporation in vacuum, and the crude product obtained is filtered in dichloromethane on neutral aluminium oxide (Act. III) to yield 805 mg of 3β-methoxy-3α,9α-epoxy-11α,18-diacetoxy-20-oxo-5β-pregnane which, after one crystallization from acetone/hexane, melts at 151°–152°. $[\alpha]_D = +106°$ (0.46). IR: 1735, 1705, 1245.

h. 500 mg of 3β-methoxy-3α,9α-epoxy-11α,18-diacetoxy-20-oxo-5β-pregnane in 40 ml of carbon tetrachloride are boiled for one hour with 208 mg of finely pulverized 96 percent N- bromosuccinimide and 10 mg of aza-bis-isobutyronitrile while irradiating externally with a 1,000 W incandescent lamp. After cooling, the precipitated succinimide is removed by filtration, rinsed with carbon tetrachloride, and the filtrate is concentrated by evaporation in vacuum. The resultant bromination product, without purification, is heated at 120° for 160 minutes under a nitrogen atmosphere in 40 ml of absolute dimethyl formamide with 500 mg of lithium carbonate and 500 mg of lithium bromide. The mixture is then diluted with a large amount of ethyl acetate, and the organic phase is washed at least 5 times with water. After drying and evaporating the ethyl acetate phase, 488 mg of crystals are obtained which, in dichloromethane, are filtered on neutral aluminium oxide (Act. III) to yield 435 mg of 3$\beta$-methoxy-3$\alpha$,9$\alpha$-epoxy-11$\alpha$,18-diacetoxy-20-oxo-$\Delta^{16}$-5$\beta$-pregnene which, after crystallizing twice (307 mg), melts at 167°–168°. [$\alpha]_D$ = +61° (0.53). IR: 1730, 1668, 1590, 1245. UV: 237 (8750). After chromatography of the mother liquor in hexane/acetone solution (3:1) on silica gel and subsequent crystallization from acetone/hexane, 37 mg more of the product can be obtained.

i. 500 mg of 3$\beta$-methoxy-3$\alpha$,9$\alpha$-epoxy-11$\alpha$,18-diacetoxy-20-oxo-$\Delta^{16}$-5$\beta$-pregnene in 150 ml of carbon tetrachloride are boiled for 17 minutes with 240 mg of 96 percent N-bromosuccinimide and 20 mg of aza-bis-isobutyronitrile while irradiating externally with a 1,000 W incandescent lamp. After cooling, the precipitated succinimide is removed by filtration. After concentration of the filtrate by evaporation, the residue obtained is dissolved in 50 ml of absolute dimethyl formamide and heated under nitrogen for 10 minutes at 130° while stirring with 500 mg of lithium bromide and 500 mg of lithium carbonate. The mixture is then substantially concentrated in vacuum, diluted with ethyl acetate, and washed several times with water. After drying and concentration by evaporation of the organic phase, the crude product obtained is chromatographed in benzene/ethyl acetate solution (2:1) on silica gel to yield 330 mg of 3$\beta$-methoxy-3$\alpha$,9$\alpha$-epoxy-11$\alpha$,18-diacetoxy-20-oxo-$\Delta^{14,16}$-5$\beta$-pregnadiene which, after crystallizing once from acetone/hexane, melts at 146°–147°. [$\alpha]_D$ = +302° (0.50). IR: 1730, 1645, 1525, 1465, 1245, 845. UV: 312 (10550).

j. 250 mg of 3$\beta$-methoxy-3$\alpha$,9$\alpha$-epoxy-11$\alpha$,18-diacetoxy-20-oxo-$\Delta^{14,16}$-5$\beta$-pregnadiene which has been purified by chromatography but not recrystallized, are boiled for 80 minutes with 500 mg of p-nitro-perbenzoic acid in a mixture of 100 ml of chloroform and 1 ml of absolute methanol. The mixture is then diluted with ethyl acetate, and successively washed with ice-cold, aqueous solutions of sodium iodide, sodium thiosulphate, sodium chloride, sodium bicarbonate and again sodium chloride. After concentration of the organic phase by evaporation, the crude product obtained is chromatographed in hexane/acetone solution (2:1) on silica gel to yield 210 mg of 3$\beta$-methoxy-3$\alpha$,9$\alpha$:14$\beta$,15$\beta$-diepoxy-11$\alpha$,18-diacetoxy-20-oxo-$\Delta^{16}$-5$\beta$-pregnene which, after crystallizing three times from acetone/hexane, melts at 198°. [$\alpha]_D$ = +66° (0.58). IR: 1735, 1670, 1605, 1240. UV: 248 (6890).

k. 100 mg of 3$\beta$-methoxy-3$\alpha$,9$\alpha$:14$\beta$,15$\beta$-diepoxy-11$\alpha$,18-diacetoxy-20-oxo-$\Delta^{16}$-5$\beta$-pregnene in 20 ml of ethanol are thoroughly hydrogenated in the presence of 40 mg of 5 percent palladium on barium sulphate. Then the catalyst is removed by filtration. Chromatography in benzene/ethyl acetate solution (1:1) on silica gel yields 55 mg of 3$\beta$-methoxy-3$\alpha$,9$\alpha$-epoxy-11$\alpha$,18-diacetoxy-14$\beta$-hydroxy-20-oxo-5$\beta$,17$\alpha$-pregnane which, after crystallizing once from acetone/hexane, melts at 154°. [$\alpha]_D$ = 0° (0.40). IR: 3600, 3400 broad, 1735, 1705, 1245.

l. 200 mg of sodium boro-hydride in 1 ml of water are added at room temperature to 197 mg of 3$\beta$-methoxy-3$\alpha$,9$\alpha$-epoxy-11$\alpha$,18-diacetoxy-14$\beta$-hydroxy-20-oxo-5$\beta$,17$\alpha$-pregnane in 10 ml of methanol. The mixture is then stirred for 20 minutes at room temperature, diluted with a large amount of ethyl acetate, and the resulting organic phase is washed neutral with saturated, aqueous sodium chloride solution. It is then dried with magnesium sulphate and evaporated in vacuum. The resultant crude product is acetylated in 20 ml of pyridine/acetanhydride mixture (1:1) for 3 hours at room temperature, then evaporated in vacuum and chromatographed in benzene/ethyl acetate solution (1:1) on silica gel, whereby 172 mg of 3$\beta$-methoxy-3$\alpha$,9$\alpha$-epoxy-11$\alpha$,18,20$\xi$-triacetoxy-14$\beta$-hydroxy-5$\beta$,17$\alpha$-pregnane are eluted. After crystallizing twice from acetone/hexane, it melts at 195°. [$\alpha]_D$ = +7° (0.31). IR: 3570, 1725, 1250.

m. 132 mg of 3$\beta$-methoxy-3$\alpha$,9$\alpha$-epoxy-11$\alpha$,18,20$\xi$-triacetoxy-14$\beta$-hydroxy-5$\beta$,17$\alpha$-pregnane are boiled for 7 minutes in 18 ml of a 0.1 percent sodium bicarbonate solution in 90 percent aqueous methanol. The reaction solution is then poured onto ice, immediately extracted with ethyl acetate, and the organic phase is washed neutral with saturated, aqueous sodium chloride solution. After drying and concentrating by evaporation of the ethyl acetate phase, the crude product obtained is chromatographed in benzene/ethyl acetate solution (1:1) on silica gel to yield, besides 18 mg of starting material, 83 mg of 3$\beta$-methoxy-3$\alpha$,9$\alpha$-epoxy-11$\alpha$,20$\xi$-diacetoxy-14$\beta$,18-dihydroxy-5$\beta$,17$\alpha$-pregnane which, after crystallizing once from acetone/hexane, melts at 203°–205°. λ$\alpha]_D$ = –2° (0-.47). IR: 3600, 3460 broad, 1725, 1250.

n. 90 mg of 3$\beta$-methoxy-3$\alpha$,9$\alpha$-epoxy-11$\alpha$,20$\xi$-diacetoxy-14$\beta$,18-dihydroxy-5$\beta$,17$\alpha$-pregnane in 10 ml of acetone are oxidized at 0° with stirring for 3 minutes with a slight excess of an 8 N solution of chromium trioxide in 8 N aqueous sulphuric acid (0.35 ml). Then the excess chromium trioxide is decomposed by the addition of isopropanol, the mixture is diluted with ethyl acetate, and washed neutral as quickly as possible with saturated, aqueous sodium chloride solution. After drying and concentration by evaporation of the ethyl acetate phase, the resulting crude product is chromatographed in benzene/ethyl acetate solution (1:1) on silica gel to yield 62 mg of 3$\beta$-methoxy-3$\alpha$,9$\alpha$-epoxy-11$\alpha$,20$\xi$-diacetoxy-14$\beta$-hydroxy-18-oxo-5$\beta$,17$\alpha$-pregnane which, after crystallizing once from acetone/hexane, melts at 209°. [$\alpha]_D$ = +13° (0.40). IR: 3580, 3450, 2730, 1730, 1705, 1250.

o. 64 mg of 3$\alpha$-methoxy-3$\alpha$,9$\alpha$-epoxy-11$\alpha$,20$\xi$- diacetoxy-14β-hydroxy-18-oxo-5β,17α-pregnane are heated with 1 ml of methylamine in 10 ml of absolute benzene for 15 hours in a closed tube at 120°. After evaporating in vacuum, the residue is dissolved in 10 ml of acetanhydride/pyridine mixture (1:1), then left for 3 hours at room temperature and concentrated by evaporation in vacuum. 67 mg of 3β-methoxy-3α,9α-epoxy-11α,20ξ-diacetoxy-14β-hydroxy-18-methylimino-5β,17α-pregnane are obtained. IR: 3200 broad, 1725, 1665, 1250.

p. The methylimino compound obtained according to (o) is reduced in 10 ml of methanol with 75 mg of sodium boro-hydride in 1 ml of water for 20 minutes at room temperature. Then ethyl acetate is added to the reaction mixture which is then washed neutral with saturated, aqueous sodium chloride solution, and concentrated by evaporation. 60 mg of 3β-methoxy-3α,9α-epoxy-11α,20ξ-diacetoxy-14β-hydroxy-18-methylamino-5β,17α-pregnane are obtained. IR: 3500–2600, 2790, 1725, 1250.

q. The methylamino compound obtained according to (p) is dissolved together with 77 mg of chloroacetyl chloride in 10 ml of chloroform. While stirring vigorously, 28 mg of sodium hydroxide in 2 ml of water are added at 0°. After 10 minutes, the solution is diluted with ethyl acetate, the organic phase is separated, washed neutral with saturated, aqueous sodium chloride solution, dried with magnesium sulphate, evaporated in vacuum, and the residue is chromatographed in ethyl acetate on silica gel to yield 42 mg of 3β-methoxy-3α,9α-epoxy-11α,20ξ-diacetoxy-14β-hydroxy-18-(N-methyl-2-chloracetamide)-5β,17α-pregnane which, after crystallizing once from acetone/hexane, melts at 173°. $[\alpha]_D = +12°$ (0.42). IR:3350 broad, 1725, 1640, 1250.

r. 33 mg of 3β-methoxy-3α,9α-epoxy-11α,20ξ-diacetoxy-14β-hydroxy-18-(N-methyl-2-chloracetamido)-5β,17α-pregnane are dissolved in 3 ml of absolute tetrahydrofuran and 3 ml of absolute benzene; first 20 mg of sodium hydride and then 0.1 ml of a solution of 160 mg of ethanol in 100 ml of absolute tetrahydrofuran are added. The mixture is boiled for 4 hours under an argon atmosphere. The excess sodium hydride is then carefully decomposed by the addition of moist ether. Then the reaction mixture is diluted with ethyl acetate and washed neutral with saturated aqueous sodium chloride solution. After concentration by evaporation, the residual crude product is chromatographed in ethyl acetate on silica gel. 26 mg of 1'-methyl-2'-oxo-3β-methoxy-3α,9α-epoxy-11α,20ξ-diacetoxy-14β,18-(epoxyethanoimino)-5β,17α-pregnane is obtained which, after recrystallizing once from acetone/hexane, melts at 239°–240°. $[\alpha]_D = -64°$ (0.25). IR: 1725, 1650, 1250.

s. An amount of 100 mg of 1'-methyl-2'-oxo-3β-methoxy-3α,9α-epoxy-11α,20ξ-diacetoxy-14β,18-(epoxyethanoimino)-5β,17α-pregnane is reacted, analogously to Example 4 o), with 300 mg of phosphorus pentasulphide. In this way are obtained 84 mg of 1'-methyl-2'-thioxo-3β-methoxy-3α,9α-epoxy-11α,20ξ-diacetoxy-14β,18-(epoxyethanoimino)-5β,17α-pregnane [IR: 1730, 1515, 1245, 1060, 1010, 960, 920, which is further processed without purification.

EXAMPLE 6

An amount of 40 mg of 1'-methyl-2'-thioxo-17β-acetoxy-5β,19-(epoxyethanoimino)-androstane (cp. Example 7) is stirred in 5 ml of absolute acetone with ca. 500 mg of deactivated Raney nickel (deactivated by being washed eight times with acetone) for 15 minutes at room temperature. The mixture is filtered through Celite (trade-name of Johns Manville International Corps., New York), concentrated in vacuo, and chromatographed in ethyl acetate/methanol solution (9:1) on silica gel. In this manner are eluted 35 mg of 1'-methyl-17β-acetoxy-5β,19-(epoxyethanoimino)-androstane which, after one crystallisation from methanol/water, melts at 122°–123°. $[\alpha]_D = +46°$ (0.44 in $CHCl_3$). IR: 1730, 1250 cm$^{-1}$.

EXAMPLE 7

The thiolactam used in the Example 6 can be produced as follows:

a. To 4 g of 3-oxo-17β,19-diacetoxy-Δ$^4$-androstene in 60 ml of methanol/methylene chloride-(2:1)-mixture are added simultaneously, whilst stirring is maintained, at 11° 1 ml of 10 percent aqueous sodium hydroxide solution and 6 ml of 30 percent aqueous hydrogen peroxide solution. The mixture is then stirred for 3 days at + 4° and ethyl acetate is added. The organic phase is separated, washed with saturated sodium chloride solution and concentrated by evaporation. For subsequent acetylation, excess acetic anhydride/pyridine-(1:1) is added to the residue, the mixture allowed to stand for ca. 14 hours and then concentrated by evaporation in vacuo. Chromatography of the residue on silica gel in benzene/ethyl acetate-(2:1) yields 3 g of 3-oxo-4β,5β-epoxy-17β,19-diacetoxy-androstane, M.P. 127°. $[\alpha]_D = +122°$ (0.21). IR: 1730–1700, 1250.

b. To 2.2 g of 3-oxo-4β,5β-epoxy-17β,19-diacetoxy-androstane in 130 ml of ethanol are added 0.5 ml of glacial acetic acid and 1 ml of hydrazine hydrate and the whole allowed to stand for 30 minutes at 20°. After the addition of ethyl acetate, washing is carried out with saturated sodium chloride solution and the organic phase concentrated by evaporation in vacuo. Chromatography of the residue in benzene/ethyl acetate-(2:1) yields 1.5 g of 5β-hydroxy-17β,19-diacetoxy-Δ$^3$-androstene, M.P. 128°–129°. $[\alpha]_D = +62°$ (0.45). IR: 3580, 1730, 1250.

c. 100 mg of 5β-hydroxy-17β,19-diacetoxy-Δ$^3$-androstene are exhaustively hydrogenated in 15 ml of ethanol in the presence of 50 mg of prehydrogenated platinum oxide catalyst. After removal by filtration of the catalyst, concentration and crystallisation of the crude product, 80 mg of 5β-hydroxy-17β,19-diacetoxy-androstane, M.P. 102°–103°, are obtained. $[\alpha]_D = +6°$ (0.34). IR: 3590, 1730, 1250.

d. 100 mg of 5β-hydroxy-17β,19-diacetoxy-androstane are boiled for 25 minutes in a mixture of 22 ml of methanol and 2.55 ml of 1 percent aqueous sodium bicarbonate solution. After the addition of ethyl acetate, washing with saturated sodium chloride solution, concentration by evaporation of the organic phase and chromatography of the residue in benzene/ethyl acetate-(2:1) on silica gel, 60 mg of 5β,19-dihydroxy-17β-acetoxy-androstane, M.P. 198°–199°, are obtained. $[\alpha]_D = +18°$ (0.49). IR: 3590, 3440 (broad), 1725, 1250.

e. 100 mg of 5β,19-dihydroxy-17β-acetoxy-androstane are added to a suspension of 5 g of silver carbonate on Celite (for method cp. M. Fetizon and M. Golfier, C.R. 267, 900 (1968)) in 15 ml of abs. benzene, dewatering is additionally carried out by azeotropic distilling off of ca. 5 ml of benzene and refluxing is performed for 3 hours. This is followed by filtration through Celite, subsequent washing with benzene, concentration by evaporation in vacuo and crystallisation once from acetone/hexane of the obtained 5β-hydroxy-17β-acetoxy-19-oxo-androstane (90 mg). M.P. = 149° with decomposition. [α]$_D$ = +11° (0.57). IR: 3590, 2740, 1730, 1250.

f. 1 g of 5β-hydroxy-17β-acetoxy-19-oxo-androstane is heated with 20 ml of methylamine in 100 ml of anhydrous benzene for 15 hours in a bomb-tube to 120°. Concentration by evaporation in vacuo is then performed, whereby 1.1 g of crystalline 5β-hydroxy-17β-acetoxy-19-(methylimino)-androstane are obtained [IR: 3250 (broad), 2770 ($CH_3$-N=), 1730, 1660, 1250].

g. This methylimino compound obtained according to f) is reduced in 10 ml of methanol with 1 g of sodium borohydride in 3 ml of water at 20° for 30 minutes. Ethyl acetate is then added to the reaction mixture, the whole thoroughly washed neutral with saturated sodium chloride solution and concentrated by evaporation, whereby 970 mg of crystalline 5β-hydroxy-17β-acetoxy-19-(methylamino)-androstane are obtained [IR: 3300 – 2600, 1730, 1250].

h. The methylamino compound obtained according to g) is dissolved, together with 750 mg of chloroacetyl chloride, in 30 ml of chloroform. With vigorous stirring, 235 mg of sodium hydroxide in 6 ml of water are added at room temperature. The organic phase is separated after 10 minutes, washed with saturated sodium chloride solution, concentrated by evaporation in vacuo and the residue chromatographed on silica gel in ethyl acetate. By this means are obtained 850 mg of 5β-hydroxy-17β-acetoxy-19-(N-methyl-2-chloroacetamido)-androstane, M.P. 218°–220°. [α]$_D$ = + 52° (0.50). IR: 3360, 1730. 1640, 1250.

i. 210 mg of 5β-hydroxy-17β-acetoxy-19-(N-methyl-2-chloroacetamido)-androstane are dissolved in 5 ml of anhydrous tetrahydrofuran and 5 ml of anhydrous benzene; and to this solution are successively added 35 mg of sodium hydride and 0.02 ml of a solution of 0.1 ml of ethanol in 2 ml of anhydrous tetrahydrofuran. The mixture is stirred for 30 minutes at 20° and then for 30 minutes at 40°. Ethyl acetate is added to the reaction mixture and the latter washed neutral with saturated sodium chloride solution. The crude product, obtained after concentration by evaporation in vacuo of the organic phase, is chromatographed in ethyl acetate on silica gel. Firstly obtained are 138 mg of 1'-methyl-2'-oxo-17β-acetoxy-5β,19-(epoxyethanoimino)-androstane with M.P., after two crystallisations from acetone/hexane, 193°–194°. [α]$_D$ = + 78°(0.-31). IR: 1730, 1645, 1250.

Subsequent fractions yield 17 mg of 1'-methyl-2'-oxo-17β-hydroxy-5β,19-(epoxyethanoimino)-androstane, M.P. 258°–260°. [α]$_D$ = + 84° (0.28). IR: 3590, 1645.

To effect the conversion of the 17β-hydroxy compound obtained as by-product into the main product, the by-product is dissolved in 2 ml of acetic anhydride/pyridine (1:1), and the solution allowed to stand for 15 hours at room temperature. The solution is then concentrated in vacuo and the residue recrystallised from acetone/hexane. In this manner are obtained a further 15 mg of 1'-methyl-2'-oxo-17β-acetoxy-5β,19-(epoxyethanoimino)-androstane, M.P. 193°–194°. Identification with the main product of i) according to M.P. of mixture, IR-spectrum and thin-layer chromatogram.

j. An amount of 50 mg of 1'-methyl-2'-oxo-17β-acetoxy-5β,19-(epoxyethanoimino)-androstane is refluxed with 150 mg of freshly sublimated phosphorus pentasulphide, in a nitrogen atmosphere, in 4 ml of absolute pyridine for 2 hours. The mixture is then cooled, allowed to stand at room temperature for a further 2 hours, 20 ml of methylene chloride are added and stirring is carried out at room temperature for a further 15 minutes. The reaction mixture is subsequently diluted with a large amount of methylene chloride, washed twice with saturated aqueous sodium chloride solution, dried wih magnesium sulphate, and concentrated in vacuo. Chromatography on silica gel in benzene/ethyl acetate solution (9:1) yields 49 mg of 1'-methyl-2'-thioxo-17β-acetoxy-5β,19-(epoxyethanoimino)-androstane which melts, after crystallisation from acetone/hexane (47 mg), at 203°–204°. [α]$_D$ = +78° (0.75 in $CHCl_3$). IR: 1730, 1520, 1255, 1065, 1050 $cm^{-1}$.

What we claim is:

1. Process for the production of 14β, 18- and 5β,19-(epoxyethanoimino) steroids of the general formula I,

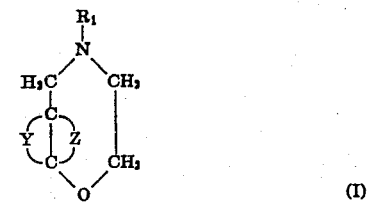

wherein
$R_1$ represents lower alkyl, benzyl or hydrogen, and one of the symbols Y and Z represents an aliphatic radical and the other a binuclear cycloaliphatic radical which together complete formula I to formula Ia

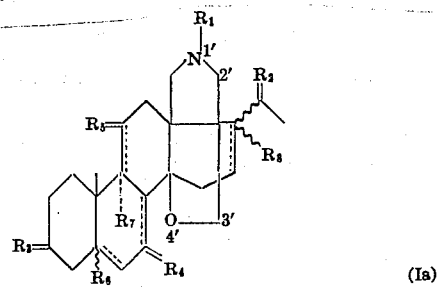

wherein
$R_1$ has the meaning given under formula I,
$R_2$ represents a protected oxo radical derived from lower alkane-diols or an hydroxyl group esterified with lower alkanoic acids or hydroxyl etherified with lower alkanols, 2-tetrahydropyranol, benzyl alcohol, triphenylmethyl alcohol, 4-methoxy-4-tetrahydropyranol, 1,1-methoxy-cyclohexanol and a hydrogen atom,
$R_3$ represents a protected oxo radical derived from lower alkane-diols or an hydroxyl group esterified with lower alkanoic acids or hydroxyl etherified with lower alkanols, 2-tetrahydropyranol, benzyl alcohol, triphenylmethyl alcohol, 4-methoxy-4-tetrahydropyranol, 1,1-methoxy-cyclohexanol and a hydrogen atom, or an etherified hydroxyl group as above and together with R₇ an epoxy radical R₄ and R₅ each independently represent a protected oxo radical derived from lower alkane-diols or an hydroxyl group esterified with lower alkanoic acids or hydroxyl etherified with lower alkanols, 2-tetrahydropyranol, benzyl alcohol, triphenylmethyl alcohol, 4-methoxy-4-tetrahydropyranol, 1,1-methoxy-cyclo-hexanol and a hydrogen atom, or two hydrogen atoms, or, when occurring at a double bond, one hydrogen atom R₆ represents α- or β-oriented hydrogen, R₇ represents α-oriented hydrogen, α-oriented hydroxyl, or together with R₃ epoxy, and R₈ represents α- or β-oriented hydrogen, or an esterified or etherified hydroxyl group, as above whereby double bonds may be present in the positions 5, 7, 9 (11) corresponding to the dotted lines with the elimination of R₆, R₇ and/or R₈, or to formula Ib,

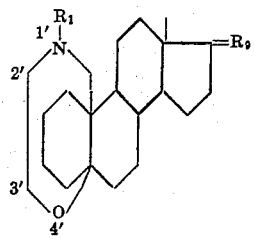

(Ib)

wherein

R₁ has the meaning given under formula I, and

R₉ represents a protected oxo radical as above or an esterified or etherified hydroxyl group as above in the β-position together with a hydrogen atom or a lower aliphatic hydrocarbon radical whereby in the other, unoccupied positions of the steroid structure there can be present double bonds and/or esterified or etherified or hydroxyl groups as above, additional methyl groups, protected oxo radicals as above, methylene groups, or epoxy radicals as substituents, and of their acid addition salts, wherein a compound of the general formula II

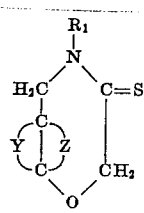

(II)

wherein R₁, Y and Z have the meaning given for formula I, is reacted with Raney-Nickel in an organic solvent.

2. Process according to claim 1, wherein a compound of the general formula IIa

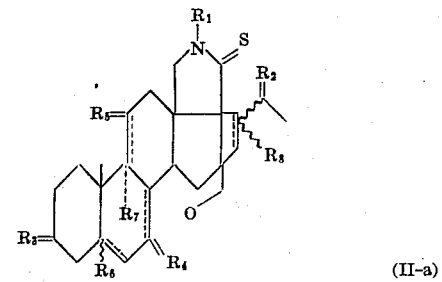

(II-a)

wherein R₁ to R₈ have the meanings given in claim 1 and double bonds may be present as specified in said claim is reacted with Raney-Nickel in an organic solvent.

3. Process according to claim 1, wherein a compound of the general formula IIb

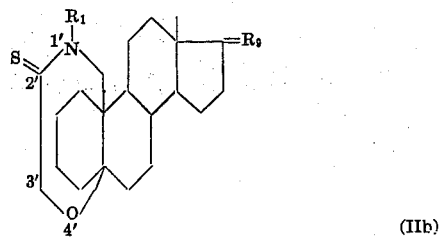

(IIb)

wherein R₁ and R₉ have the meanings given in claim 1, and substituents and double bonds may be present as specified in said claim, is reacted with Raney Nickel in an organic solvent.

4. Process according to claim 1, wherein a compound of the general formula II as illustrated in claim 1, wherein R₁, Y and Z have the meanings defined in said claim, is reacted with the 2- to 20-fold amount by weight of Raney Nickel in an organic solvent.

5. Process according to claim 1, wherein the reaction is carried out at a temperature between 0° to 50°C.

6. Process according to claim 1, wherein ethanol, methanol or acetone is used as organic solvent.

7. Process according to claim 1, wherein the reaction is carried out at room temperature.

8. Process according to claim 1, wherein 1'-methyl-2'-thioxo-3β, 20ξ-diacetoxy-14β, 18-(epoxyethanoimino)-5α, 17α-pregnane is used as starting material.

9. Process according to claim 1, wherein 1'-methyl-2'-thioxo-3β-methoxy-3α, 9α-epoxy-11α, 20ξ-diacetoxy- 14β, 18-(epoxyethanoimino)-5β, 17α-pregnane is used as starting material.

10. Process according to claim 1, wherein 1'-methyl 2'-thioxo-17β-acetoxy-5β, 19-(epoxyethanoimino)-androstane is used as starting material.

11. A member selected from the group consisting of a compound of the formula

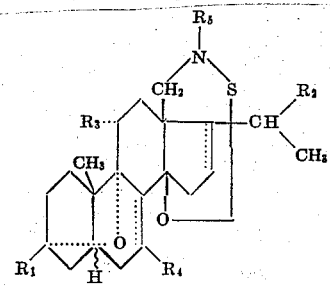

wherein $R_1$, $R_2$, $R_3$, $R_4$ are selected from the group consisting of hydroxy, lower alkoxy and lower alkanoyloxy, and $R_5$ is a lower alkyl group, and wherein the dotted lines indicate that in the positions indicated there can optionally be double bonds and the wavy lines indicate that both the α- and β-configuration are possible, and a compound of the formula

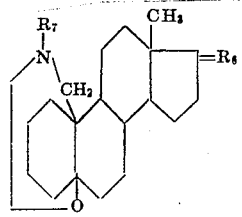

wherein $R_6$ represents a protected oxo radical or a hydroxyl group esterified with a lower alkanoic acid or etherified with a lower aliphatic alcohol, together with a hydrogen atom, and $R_7$ a lower alkyl group.

12. A compound according to claim 11, which is 1'-methyl-2'-thioxo-3β-20ξ-diacetoxy-14β,18-(epoxyethanoimino)-5α,17α-pregnane.

13. A compound according to claim 11, which is 1'-methyl-2'-thioxo-3β-methoxy-3α-9α-epoxy-11α,20ξ-diacetoxy-14β,18-(epoxyethanoimino)-5β,17α-pregnane.

14. A compound according to claim 11, which is 1'-methyl-2'-thioxo-17β-acetoxy-5β,19-(epoxyethanoimino)-androstane.

* * * * *